United States Patent [19]

Edens

[11] Patent Number: 4,563,116

[45] Date of Patent: Jan. 7, 1986

[54] TOOL HOLDER WITH COOLANT INDUCER

[76] Inventor: Rudolph R. Edens, 911 S. Oxford, Grosse Pointe Woods, Mich. 48236

[21] Appl. No.: 610,693

[22] Filed: May 16, 1984

[51] Int. Cl.[4] .......................... B23C 5/26; B23C 5/28
[52] U.S. Cl. .................................. 409/136; 409/232; 409/234; 409/59; 279/81; 279/20
[58] Field of Search ...................... 409/136, 232, 234; 279/20, 93, 97, 103, 1 A, 1 B, 81; 408/57, 59, 239

[56] References Cited

U.S. PATENT DOCUMENTS

| 2,731,273 | 1/1956 | Edens | 279/81 |
| 3,364,800 | 1/1968 | Benjamin et al. | 408/59 |
| 3,747,946 | 7/1973 | Edens | 279/81 |

*Primary Examiner*—Donald R. Schran
*Attorney, Agent, or Firm*—Reising, Ethington, Barnard, Perry & Milton

[57] ABSTRACT

A tool holder with a coolant inducer and a quick acting locking mechanism is disclosed. The holder body is provided with a tapered bore to receive the tapered shank of a cutting tool. The tapered shank has cam surfaces for engagement with locking pins in the holder body to cam the shank into drive transmitting and fluid-tight engagement with the tapered bore. A locking mechanism locks the tapered shank in the camming relationship with the locking pins and a retaining mechanism holds the mechanism in its locked position. A coolant inducer comprises an inducer ring at the upper end of the holder body and defining a fluid-tight chamber therewith. A fluid conduit is connected through a fitting in the inducer ring to the chamber which communicates with the upper end of the tapered bore in the holder body. A passage extends from the upper end of the tapered shank of the cutting tool in communication with said bore to the lower end of the cutting tool whereby coolant is supplied from the upper end of the tapered bore to the upper end of the tapered shank and a fluid-tight seal is provided by the engagement of the tapered shank and bore.

4 Claims, 6 Drawing Figures

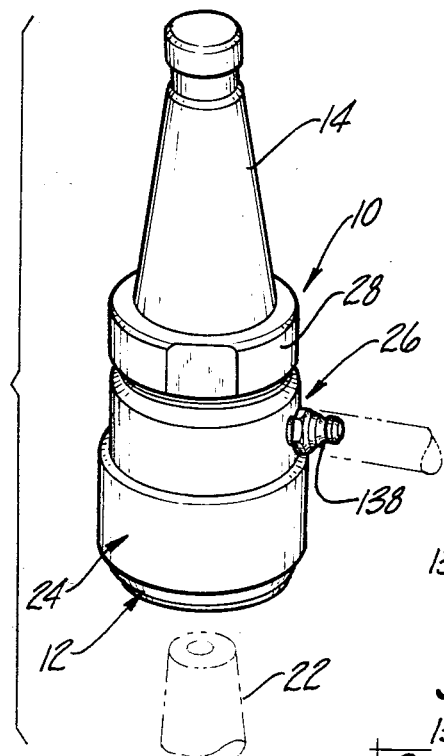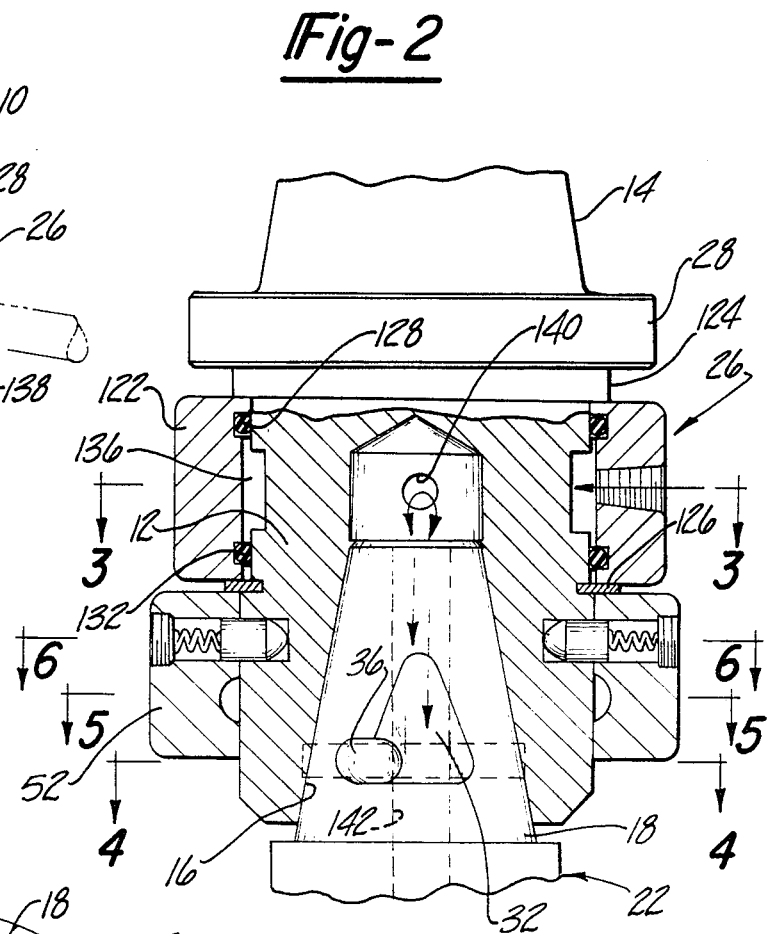

4,563,116

TOOL HOLDER WITH COOLANT INDUCER

FIELD OF THE INVENTION

This invention relates to tool holders and more particularly it relates to a tool holder with a coolant inducer.

BACKGROUND OF THE INVENTION

It is common practice in metal cutting operations to utilize a cutting tool having fluid passages for supplying a liquid coolant to the interface of the workpiece and the cutting tool. This affords advantages including a greatly enhanced cutting speed.

One of the problems in the use of such cutting tools is the requirement for a tool holder which not only provides positive driving engagement with the cutting tool but also conveys the liquid coolant to the cutting tool without leakage. Further, it is desired to provide the tool holder with a quick acting lock and release mechanism for the cutting tool. Further, the tool holder should accept a standardized tool shank so that it is of universal application.

Several forms of combined tool holders and coolant inducers are known in the prior art. The Bostley U.S. Pat. No. 3,791,660 discloses a tool holder with a coolant inducer in which the tool holder comprises a collet with a split sleeve and nut for holding a straight shank drill. A coolant inducer ring is mounted on the tool holder and supplies liquid coolant to the upper end of the bore in the collet. To prevent leakage, an O-ring type seal is provided internally of the collet.

The Maynard U.S. Pat. No. 2,946,244 discloses a drill spindle with a coolant inducer mounted thereon. The spindle is provided with a tapered bore to receive the tapered shank of a drill. This arrangement does not include a tool holder with a lock and release mechanism for the cutting tool. The Wenz U.S. Pat. No. 2,977,827 discloses a machine tool which receives a tool holder with a tapered opening to receive the tapered shank of a cutting tool which is secured by a threaded bushing in the tool holder. This arrangement provides no quick acting lock and release mechanism for the cutting tool.

A general object of this invention is to provide an improved tool holder with a coolant inducer which overcomes certain disadvantages of the prior art.

SUMMARY OF THE INVENTION

In accordance with this invention, a tool holder with a quick acting locking mechanism is adapted to supply a coolant to a cutting tool held thereby. This is accomplished by a tool holder having a tapered bore for receiving at tapered shank cutting tool, a locking mechanism for maintaining the tapered shank in fluid-tight and drive transmitting engagement with the tapered bore and a coolant inducer on the tool holder to supply coolant to the upper end of the tapered bore and thence to a passage through the cutting tool.

Further, in accordance with this invention, a tool holder is provided with a locking mechanism including a pair of locking pins extending transversely of a tapered bore in the holder body and disposed on opposite sides of and extending into the bore. A tool having a tapered shank with diametrically opposed flat surfaces thereon and a pair of cam grooves extending circumferentially from the flat surfaces is adapted to receive the locking pins upon rotation of the shank and thereby cam the tapered shank into fluid-tight, drive transmitting engagement with the bore. A pair of locking cams in the body are actuated by a cam lock ring rotatably mounted on the body to engage said pair of flat surfaces when the locking ring is turned from an unlocked position to a locked position, thereby maintaining the fluid-tight, drive transmitting engagement during rotatative drive of the tool. A coolant inducer ring is rotatably mounted on the holder body between the cam lock ring and the drive shank and with the holder body, defines an annular chamber communicating with a fitting on the ring. Sealing means are disposed between the inducer ring and the body to maintain the chamber fluid tight during relative rotation of the body and the ring. A passage extends through the holder body from the chamber to the upper end of the tapered bore and the tool includes a fluid passage at the upper end thereof opening into the upper end of the tapered bore extending to the lower end of the tool. Thus, fluid coolant is supplied from the fitting through the coolant inducer ring and the holder body to the tool during rotation thereof.

A more complete understanding of this invention may be obtained from the detailed description that follows taken with the accompanying drawings.

DESCRIPTION OF THE DRAWINGS

FIG. 1 is a perspective view of the tool holder of this invention;
FIG. 2 is a cross-section of the tool holder;
FIG. 3 is a cross-section taken on line 3—3 of FIG. 2;
FIG. 4 is a cross-section taken on line 4—4 of FIG. 2.

BEST MODE FOR CARRYING OUT THE INVENTION

Figure 5:
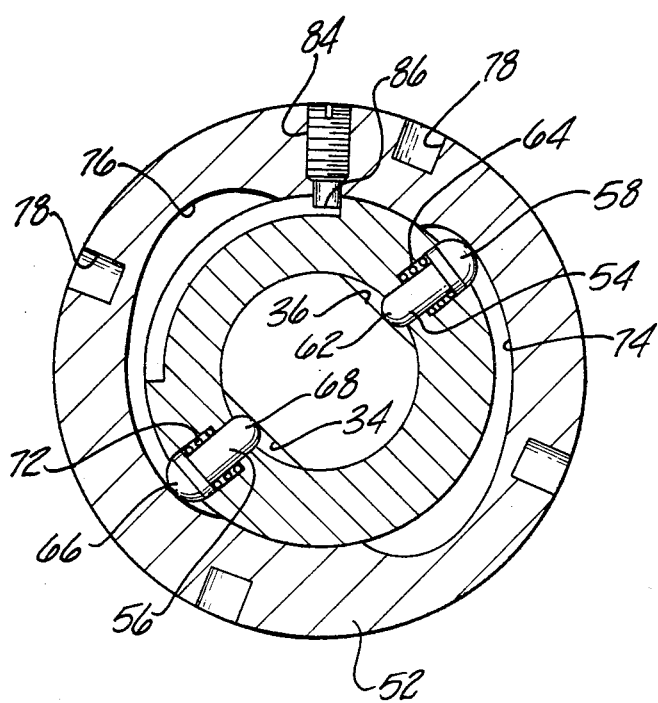
FIG. 5 is a cross-section taken on line 5—5 of FIG. 2.

Referring now to the drawings, there is shown an illustrative embodiment of the invention in a tool holder including a coolant inducer and having a particular quick acting lock and release mechanism for a tapered shank tool. It will be appreciated as the description proceeds, that the invention may be realized in other embodiments.

Referring now to FIG. 1, the tool holder 10 of this invention is shown in a perspective view. It comprises, in general, a holder body 12 provided with a tapered shank 14 which is adapted to mate with a tapered bore in the tool head or spindle (not shown) of a machine tool for rotative driving connection. The body 12 is provided with a tapered bore 16 at the lower end thereof which is adapted to receive the tapered shank 18 of a cutting tool, such as a drill bit. A quick acting tool locking mechanism 24 is mounted on the holder body 12 at the lower end thereof and coacts with the tapered shank 18 of the cutting tool 22 in a manner which will be described in detail subsequently. A coolant inducer 26 is mounted on the holder body 12 at a location between the locking mechanism 24 and an annular shoulder 28 on the holder body 12.

The tool holder of FIG. 1 will now be described in greater detail with particular reference to FIGS. 2 through 6. The quick acting tool locking mechanism 24 coacts with the shank 18 of the tool 22 to lock it in a drive transmitting, fluid-tight engagement with the tapered bore 16 of the tool holder. For this purpose, the tapered shank 18 is provided with a pair of diametrically opposed flat surfaces 32 and 34. A cam groove 36 extends circumferentially from the lower edge of the flat surface 32 and is of arcuate configuration in cross-section. Similarly, a cam groove 38 extends circumferentially from the bottom of the flat surface 34 and is of arcuate configuration in cross-section and is disposed diametrically opposite to the cam groove 36. A pair of locking pins 42 and 44 are disposed diametrically opposite each other in transversely extending bores in the holder body 12 adjacent the lower end of the tapered bore 16. The locking pins 42 and 44 are cylindrical. The transverse bore for each of the locking pins intercepts the tapered bore 16 in the holder body 12 in a tangential direction and the inner portion of each of the pins 42 and 44 extend into the tapered bore. For mounting the cutting tool 22 in the holder 12, the tapered shank 18 of the cutting tool is inserted into the tapered bore 16 with the flat surfaces 32 and 34 aligned with the locking pins 42 and 44 which are disposed in a clearance relationship to permit full insertion of the tool shank. The tool 22 is then rotated in a clockwise direction (bottom view) so that the locking pins 42 and 44 enter the cam grooves 36 and 38. The turning effort on the cutting tool 22 produces a camming action between the locking pins 42 and 44 and the walls of the cam grooves 36 and 38 so that the tapered shank 18 is cammed into close fitting engagement with the tapered bore 16. As will be discussed subsequently, this provides a drive transmitting, fluid-tight engagement between the tapered shank 18 and tapered bore 16. The locking pins 42 and 44 provide a positive driving connection between the holder body 12 and the cutting tool 22 in the forward rotative direction, i.e. counterclockwise direction (bottom view).

In order to lock the cutting tool 22 in position relative to the holder body 12, a cam lock mechanism is provided. The cam lock mechanism comprises a locking ring 52, which is rotatably mounted on the lower part of the holder body 12, and a pair of cam plungers 54 and 56 which coact with the ring. More particularly, the cam plunger 54 is reciprocably mounted in a radial passage extending through the wall of the holder body into the tapered bore 16. The cam plunger 54 is provided with a cam head 58 at its outer end and a cam nose 62 at its inner end which is extendible into the tapered bore 16. A bias spring 64 urges the cam plunger 54 radially outwardly. The cam plunger 56 is disposed diametrically opposite the cam plunger 54. It is of similar construction and comprises a cam head 66, a cam nose 68 and a bias spring 72. For actuation of the cam plungers 54 and 56, the locking ring 52 is provided with a pair of cam tracks or cam grooves 74 and 76 extending circumferentially thereof on the inner surface. As shown in FIG. 5, the cam groove 74 is aligned with and receives the cam head 58 of the cam plunger 54 and similarly the cam groove 76 coacts with the cam head 66. The cam grooves 74 and 76 have a decreasing radial depth in the counterclockwise direction (top view of FIG. 5). When the locking ring 52 is in its extreme counterclockwise position, the unlocked position, the cam plungers 54 and 56 are extended outwardly by the respective bias springs 64 and 72 so that the cam noses 62 and 68 do not engage the flat surfaces 32 and 34 on the tapered shank 18. When the locking ring 52 is rotated to the extreme clockwise position, the locked position, the cam grooves 74 and 76 cam the plungers 54 and 56 inwardly into engagement with the flat surfaces 32 and 34, respectively. It is noted that the cam plungers 54 and 56 exert a force on the tapered shank 18 tending to rotate it toward engagement of the cam grooves 36 and 38 with the respective locking pins 42 and 44. The locking ring 52 is provided with a knurled surface to facilitate manual gripping or rotating the locking ring between the locked and unlocked positions. Additionally, it is provided with a set of tool receiving recesses 78 adapted to receive a spanner wrench for tightening of the locking ring in the locked position. In order to prevent overtightening, the circumferential groove 82 is provided in the outer surface of the holder body 12 and a set screw 84 extends radially through the locking ring 52 and has a stop pin 86 thereon which extends into the groove 82. The stop pin 86 engages the ends of the groove 82 to thereby limit the extent of movement of the locking ring between the unlocked and locked positions. With the locking ring 52 in the locked position, the engagement of the cam plungers 54 and 56 with the flat surfaces on the tapered shank 18 not only urges the cam grooves 36 and 38 into engagement with the locking pins 42 and 44 but also provides a positive drive connection for reverse rotation of the cutting tool.

Figure 6:
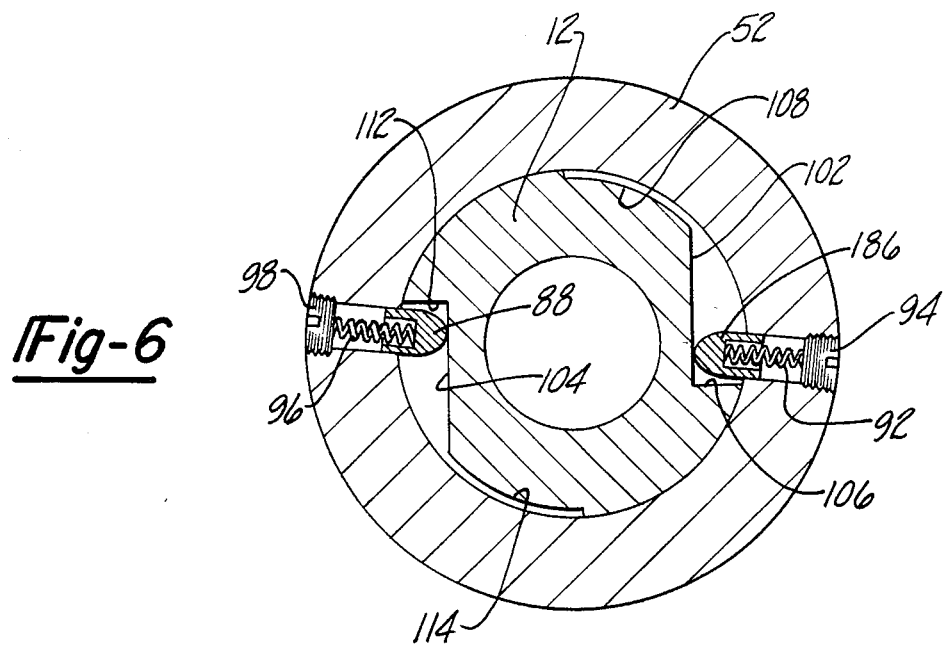
FIG. 6 is a cross-section taken on line 6—6 of FIG. 2.

In order to retain the locking ring 52 in its locked position, a retaining mechanism is provided as shown in FIG. 6. The retaining mechanism comprises a pair of retaining pistons 86 and 88 which are mounted in respective passages in the wall of the holder body 12 at diametrically opposite positions. The retaining piston 86 is biased inwardly by a coil spring 88 which is seated against a set screw 94. Similarly, the retaining piston 88 is biased inwardly by a coil spring 96 which is seated against a set screw 98. The holder body 12 is provided with a pair oppositely disposed flat surfaces 102 and 104 which are engaged by the retaining pistons 86 and 88, respectively, with the locking ring 52 in the locked position. The flat surfaces 102 and 104 extend parallel to each other along a chord line of the holder body 12. The flat surface 102 terminates at one end in the shoulder 106 and at the other end it joins a cylindrical surface 108 of reduced diameter. Similarly, the flat surface 104 terminates at one end in a shoulder 112 and at the other end it joins a cylindrical surface 114 of reduced diameter. When the locking ring 52 is in the unlocked position, the retaining pistons 86 and 88 are seated against the cylindrical surfaces 108 and 114 and thus, there is little resistance to rotation of the locking ring by reason of the retaining pistons 86 and 88. When the locking ring 52 is rotated to the locked position, the retaining pistons 86 and 88 press against the flat surfaces 102 and 104, respectively, under the force of springs 92 and 96 and thus rotation of the locking ring toward the unlocked position is resisted thereby.

The coolant inducer 26 comprises an annular ring 122 which is rotatably mounted on the holder body 12. The ring 22 is retained axially by a shoulder 124 on the holder body 12 and by a snap ring 126 seated in a groove in the body. The coolant inducer ring 122 is rotatably mounted on a pair of axially spaced O-rings 128 and 132 which are seated in respective grooves in the holder body 12 and the inducer ring 122. The holder body 12 is provided with an undercut groove 124 between the O-rings 128 and 132. Thus, the coolant inducer ring 122 and the holder body 12, together with the O-rings 128 and 132, define a fluid-tight chamber 136. A quick disconnect fluid fitting 138 is mounted in the coolant inducer ring 122 and is adapted to receive a coolant fluid conduit which communicates through the fitting 138 with the fluid-tight chamber 136. A radial passage 140 extends from the chamber 136 through the wall of the holder body 12 to the upper end of the tapered bore 16. The cutting tool 22 is provided with an axial passage 142 which extends from the upper end of the tool, in communication with the upper end of the tapered bore 16, to the lower end of the tool whereby a fluid coolant may be supplied from the fitting 138 through the coolant inducer ring 122 and through said holder body to the tool during rotation thereof.

In use of the tool holder 10, the cutting tool 22 is installed and locked in the following manner. First, the locking ring 52 is placed in the unlocked position. The tapered shank 18 of the cutting tool 22 is inserted into the tapered bore 16 with the flat surfaces 32 and 34 aligned with the locking pins 42 and 44 and then the tool 22 is rotated so that the locking pins enter the cam grooves 36 and 38, respectively. Then, the locking ring 52 is rotated to the locked position, such locking action being assisted by the use of a spanner wrench if needed. This rotation of the locking ring 52 causes the cam grooves 74 and 76 to actuate the cam plungers 54 and 56, respectively, into engagement with the flat surfaces 32 and 34, respectively. When the locking ring 52 is rotated to the locked position, the retaining pistons 86 and 88 move into engagement with the flat surfaces 102 and 104 on the holder body 12 and thus retain the ring in its locked position. In this position, the tapered shank 18 is forced into drive transmitting, fluid-tight engagement with the tapered bore 16 by reason of the cam action of the locking pins 42 and 44 with the cam grooves 36 and 38, respectively. Fluid coolant is supplied through the coolant inducer 26 to the cutting tool 22; the interface of the tool 22 with the holder body 12 being sealed against fluid leakage by the engagement of the tapered shank 18 with the tapered bore 16. Thus, a drive transmitting, fluid-tight engagement of the cutting tool and tool holder is achieved together with the quick acting locking mechanism 24.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A tool holder adapted to supply a coolant to a tool therein, said holder comprising:
   a holder body having a drive shank at its upper end adapted for rotation by a machine and having an axially disposed tapered bore in its lower end,
   a pair of locking pins extending transversely of said tapered bore in said holder body and disposed on opposite sides of said tapered bore and each having a portion extending into said bore,
   a tool including a tapered shank adapted to mate with said tapered bore and having a pair of diametrically opposed flat surfaces thereon which clear said opposed locking pins upon entry of said shank into said bore, a pair of cam grooves extending circumferentially from the lower edge of said flat surfaces, respectively, and adapted to receive said locking pins upon rotation of said shank in a direction opposite to normal tool rotation and to urge said tapered shank into fluid-tight, drive transmitting engagement with said bore, whereby said engagement is continuously tightened by normal tool rotation during operation,
   a pair of locking cams in said body, a cam lock ring rotatably mounted on said body and coacting with said cams to cam them into engagement with said pair of flat surfaces, respectively, when said locking ring is turned from an unlocked position to a locked position, thereby maintaining said fluid-tight, drive transmitting engagement of the tapered shank with the tapered bore during rotative drive of said tool by said tool holder,
   a coolant inducer ring rotatably mounted on said holder body between said cam lock ring and said drive shank, a conduit fitting mounted on said coolant inducer ring,
   said coolant inducer ring and said holder body defining an annular chamber communicating with said conduit fitting, seal means disposed between the coolant inducer ring and said holder body to maintain said chamber fluid tight during relative rotation of said holder body and coolant inducer ring,
   a passage extending through said holder body from said chamber to the upper end of said tapered bore,
   said tool including a fluid passage at the upper end thereof opening into the upper end of said tapered bore and extending to the lower end of said tool whereby fluid coolant may be supplied from said fitting through said coolant inducer ring and said holder body to said tool during rotation thereof.

2. The invention as defined in claim 1 wherein, said pair of locking cams are reciprocably mounted in said holder body at diametrically opposed locations, each of said locking cams having a cam head extending radially outwardly from the holder body and a locking head extendible into said tapered bore, spring means urging said locking cams outwardly,
   said cam lock ring including a pair of cam tracks disposed thereon opposite said cam heads, respectively, for camming said locking cam inwardly when said locking is turned from its unlocked position to its locked position.

3. The invention as defined in claim 1 including,
   a pair of diametrically opposite flat surfaces parallel to each other on said holder body, a pair of diametrically opposite retaining pistons slidably disposed in said cam lock ring, a compression spring urging each of said pistons radially inwardly toward said holder body, said pair of pistons engaging said pair of flat surfaces, respectively, when said cam lock ring is rotated to its locked position.

4. The invention as defined in claim 2 including, a circumferential groove in said holder body, a stop pin mounted in said cam lock ring and extending into said groove and adapted to engage the end of said groove to stop rotation of said cam lock ring when it is turned to the fully locked position.

* * * * *